United States Patent [19]
Paskert

[11] 3,995,897
[45] Dec. 7, 1976

[54] COUPLING

[75] Inventor: Joseph H. Paskert, Lakewood, Ohio

[73] Assignee: Eaton Corporation, Cleveland, Ohio

[22] Filed: Apr. 21, 1975

[21] Appl. No.: 570,043

[52] U.S. Cl. .............................. 285/340; 285/369; 285/DIG. 3; 403/300

[51] Int. Cl.[2] ........................................ F16L 21/00

[58] Field of Search ............ 285/340, DIG. 3, 369, 285/383; 85/36; 403/372, 300, 314

[56] References Cited

UNITED STATES PATENTS

| 1,225,420 | 5/1917 | Eggert | 85/36 |
|---|---|---|---|
| 1,817,776 | 8/1931 | Sipe | 285/340 |
| 2,123,764 | 7/1938 | Berry | 85/36 |
| 2,484,192 | 10/1949 | Squiller | 285/340 X |
| 2,950,937 | 8/1960 | Bedford | 403/372 |

FOREIGN PATENTS OR APPLICATIONS

| 227,402 | 10/1958 | Australia | 85/36 |
|---|---|---|---|
| 1,029,123 | 5/1966 | United Kingdom | 285/340 |
| 1,081,702 | 8/1967 | United Kingdom | 285/340 |

*Primary Examiner*—Andrew V. Kundrat
*Attorney, Agent, or Firm*—Teagno & Toddy

[57] ABSTRACT

A threadless coupling for coupling a pipe to a support member or for coupling two or more sections of pipe together is provided. The coupling comprises an outer sleeve or housing and a plurality of substantially identical pipe end receiving and retaining fasteners received and retained within a bore, or bores, in the outer sleeve or housing. The fasteners may be utilized in variable numbers to provide selectively variable degrees of tensile retention of the pipe to the coupling. The fasteners are serrated to better grip the lengths of pipe and to compensate for the out-of-round conditions often found on the exterior surfaces of pipe.

9 Claims, 9 Drawing Figures

COUPLING

BACKGROUND OF THE INVENTION

1. Field of the Invention

This invention relates to pipe couplings and more particularly relates to threadless pipe couplings for receiving and retaining the untreated ends of lengths of pipe, such as pipes of steel, cast iron, copper, aluminum, plastic, rubber and the like.

2. Description of the Prior Art

Pipe couplings of various types are well known in the prior art. Several prior art couplings required the ends of the lengths of pipe to be threaded, flanged, outwardly flaired or otherwise deformed. Such couplings were not totally satisfactory as such deformation was costly and time consuming and made assembly in the field more difficult.

To solve the above mentioned problems, the prior art includes a number of couplings requiring no deformation or special treatment of the pipe section ends. Such connectors are generally referred to as "threadless connectors" of "threadless couplings." Examples of such prior devices may be seen by reference to U.S. Pat. Nos. 1,817,776; 2,073,338; 2,832,711; 3,033,600; 3,804,439 and 3,827,732. These prior art devices were generally improvements as they eliminated the need for threading or otherwise deforming the ends of the pipes to be connected. The prior art devices were, however, not totally satisfactory as they did not provide sufficient tensile strength for certain purposes such as coupling steel or cast iron pipe, they could not easily be produced in variable tensile strength configurations, they were difficult to remove from coupled pipes, they were complicated to assemble to the pipe and/or were not effective when utilized with a section of pipe having a pronounced out-of-round condition on the outer surface thereof.

SUMMARY OF THE INVENTION

In accordance with the present invention, the drawbacks of the prior art have been overcome to the extent that an economically produced, easily assembled, easily removed pipe coupling is provided. The coupling is capable of easily being produced in variable tensile strength configurations simply by utilizing a variable number of substantially identical fasteners and the fasteners are provided with serrated edges for good retention of cast iron, steel or other metallic pipe and for compensating for out-of-round conditions on the outer surfaces of such pipe.

The above is accomplished by utilizing an outer housing or sleeve having one bore therein for each length of pipe to be coupled. The sleeve is preferably of a metallic material such as cast iron, steel of the like. Within each bore is a plurality, or stack, of substantially identical pipe end receiving and retaining fasteners which may be stacked in variable numbers to provide variable degrees of tensile strength. The fasteners are preferably spring steel stampings of the like. The fasteners may have an outer wall for gripping the bore and preventing movement of the fasteners in the direction towards the end of the bore from which the pipe end is to be inserted. The fasteners have a plurality of generally radially inwardly extending spring fingers defining a serrated aperture in the fasteners for receipt of the pipe ends. The fingers are inclined away from the end of the bore from which the pipe is to be inserted to allow the pipe end to be relatively easily inserted into the aperture but to tightly and/or penetratingly engage the outer surface of the pipe if the pipe is moved axially towards the end of the bore from which is was inserted.

The ends of the sleeves may be inwardly flaired or otherwise deformed adjacent the open ends of the bores to assure retention of the fasteners within the sleeve bores. The sleeve may include a sealing member inserted into the bore to provide a fluid sealed coupling.

Accordingly, it is an object of the present invention to provide a new and improved threadless pipe coupling which is easily produced in variable tensile strength configurations utilizing standard components only.

Another object of the present invention is to provide a new and improved threadless pipe coupling which is easily assembled to an unprepared pipe end and which will compensate for out-of-round and/or slight over or under dimensions on the outer surface of a pipe end.

These and other objects and advantages of the present invention will become apparent from a reading of the detailed description of the preferred embodiments taken in connection with the accompanying drawings.

DESCRIPTION OF THE PREFERRED EMBODIMENT

Figure 1:
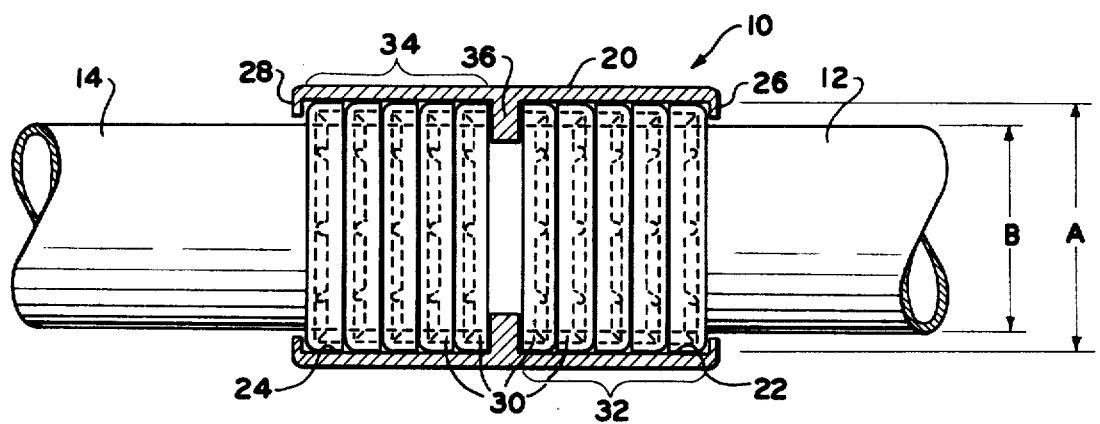
FIG. 1 is a partial sectional view illustrating one embodiment of the present invention as utilized to axially couple the ends of two sections of pipe.

A typical example of an assembly utilizing the pipe coupling 10 of the present invention may be seen by reference to FIG. 1. The assembly, or pipe joint, comprises two sections of pipe, 12 and 14, joined at the ends thereof by means of coupling 10. In this particular assembly the two sections of pipe are joined in axially aligned relationship. The coupling of the present invention may, of course, be utilized to join the end of one section of pipe to a support member or the like or may be utilized to join the ends of two or more sections of pipe at a desired angle.

The assembly, or joint, formed by utilization of the coupling of the present invention is intended for structural purposes, such as railings or fences, or for low pressure fluid transfer such as gravity flow drainage or irrigation systems.

The term pipe is intended to include all elongated axially extending members including tubing pipes and rods, and in particular axially extending members having an axially extending bore therethrough. The coupling 10 of the present invention is particularly well suited for use in connecting sections of metallic, cross-sectionally round pipes to one another.

The coupling 10 comprises an outer sleeve, or housing 20 which has a pair of bores therein, 22 and 24, each of which contains a plurality of pipe end receiving and retaining fasteners 30. The sleeve is preferably of a metallic material such as steel, cast iron or the like. The fasteners 30 are arranged in two oppositely oriented stacks, 32 and 34, which are separated by a stop member 36. The stop member 36 which separates the two bores, 22 and 24, may be an inserted member or may be formed integral with the sleeve 20. The stop member 36 should have at least one portion thereof having sufficiently radially inward extension to prevent passage of the pipe ends and the fasteners from one bore to the other bore. The diameter A of the bores, 22 and 24, is somewhat greater than the exterior diameter B of the sections of pipe, 12 and 14, to be coupled. The ends, 26 and 28, of sleeve 20 are inwardly flaired after insertion of the fasteners 30, to retain the fasteners 30 within the bores, 22 and 24, respectively.

Figures 2, 3:
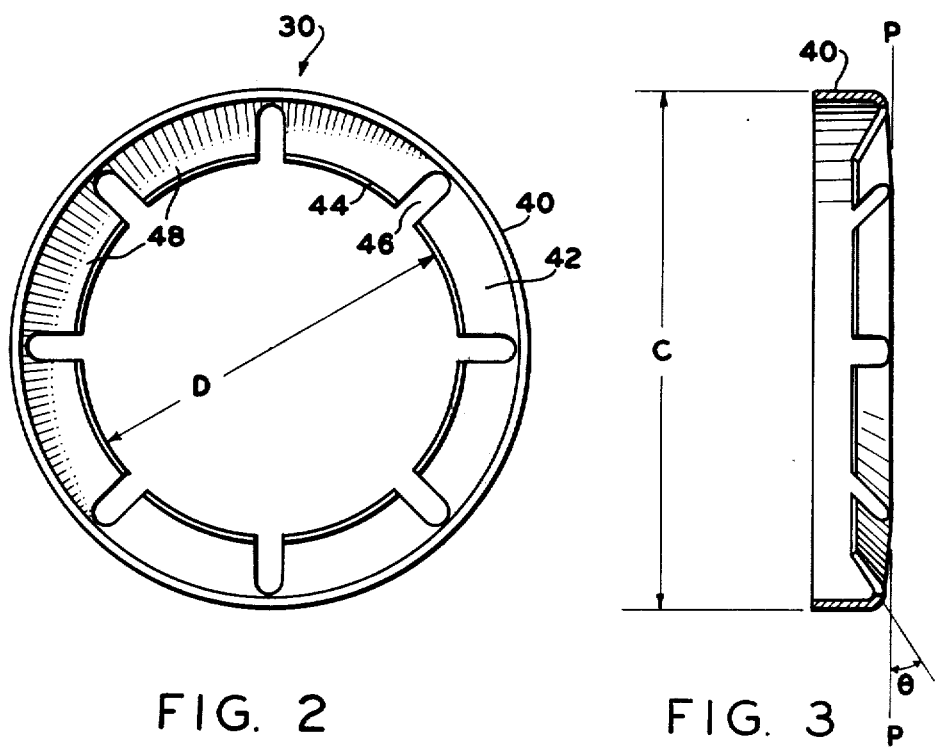
FIG. 2 is a front view of one of the pipe end receiving and retaining fasteners utilized in the embodiment of FIG. 1.
FIG. 3 is a side elevational view of the fastener of FIG. 2.

The fastener 30 utilized for receiving and retaining the ends of the sections of pipe within the sleeve 20 is illustrated in FIGS. 2 and 3. The fastener 30 comprises an annular radially outer flange 40 and an annular inner wall 42. The inner wall 42 terminates at its radially inner end at annular edge 44. Edge 44, which is radially serrated as at 46 to define a plurality of spring fingers 48, defines an aperture of diameter D through the fastener 30. The diameter D is, in the undeformed position of spring fingers 48, of a lesser dimension than the exterior diameter B of the pipe to be received. The outer flanges have an outer diameter C generally equal to the inner diameter A of the bores 22 and 24, and extend generally parallel to the axis of the aperture 50. The inner wall 42 and its spring fingers 48 extend radially inwardly and are inclined in the direction of the extension of outer flanges 40. The spring fingers 48 are inclined with respect to a plane P-P, defined by the juncture of the flange 40 and the inner wall 42, by a degree $\theta$ which is in the range of 15° – 65° and preferably is in the range of 30° – 45°. The fasteners 30 are preferably of spring steel or the like.

In assembling the coupling 10, a stack, 32 or 34, of substantially identical fasteners 30 is inserted into each of the bores, 22 and 24, respectively. The fasteners in each stack are arranged such that the outer flanges and the spring fingers thereof extend away from the ends, 26 and 28, of the bores from which the pipe ends are to be inserted. After insertion of the correct number of fasteners 30, the excess ends of the sleeve, if any, are removed and the remaining ends of the sleeve are flaired inwardly or otherwise inwardly deformed to retain the fasteners within the bores. The number of fasteners within each stack of fasteners will depend upon the required tensile strength of the coupling.

To assemble a joint utilizing the coupling 10, the ends of the pipe sections, 12 and 14, are axially inserted, or pushed into, the bores 22 and 24. The penetration of the pipe ends into the sleeve 20 is limited by stop member 36. The spring fingers 48 of fasteners 30 will resiliently cammingly deform radially outwardly and away from the direction of insertion of the pipe ends to receive the pipe ends as is well known in the art. The fingers will act independently, due to serrations 46, to compensate for out-of-round conditions on the outer surfaces of the pipe ends. A tensile force tending to remove the received pipe ends from the bores 22 and 24 of coupling 10 will cause the inner edges 44 of the fasteners 30 to tightly engage and/or penetrate the outer surface of the received pipes to prevent or resist removal of same. The provision of the serrated inner edges 44 allows the fasteners 30 to more tightly engage and/or more easily penetrate the outer surfaces of the pipe ends.

To remove the pipe ends from the coupling 10, the sleeve 20 is simply circumferentially cut at a point somewhat removed from the inwardly flaired ends, 26 and 28, of the sleeve. The pipe ends, 12 and 14, may then easily be removed from the sleeve. The fasteners 30 will remain on the pipe ends and may be individually pulled off the pipe end or may be radially split at any point, preferably at a serration 46, to release the fastener from the pipe end.

Figure 4:
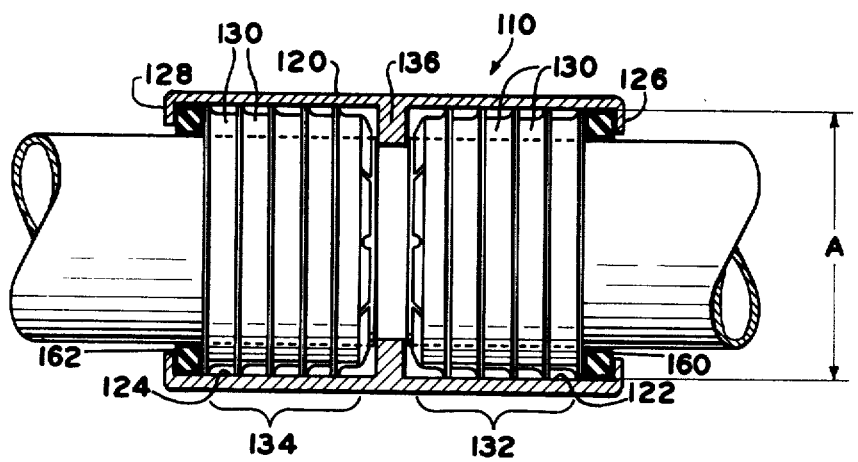
FIG. 4 is a sectional view of an alternate embodiment of the coupling of the present invention.

An alternate embodiment of the present invention may be seen by reference to FIGS. 4–7. In FIG. 4 a pipe joint utilizing alternate coupling 110 is illustrated. The coupling comprises an outer sleeve or housing 120 and a plurality of pipe end receiving and retaining fasteners 130 arranged in oppositely oriented stacks 132 and 134. A stop member 136 separates the two concentric, identical bores 122 and 124. A pair of rubber bushings, grommets or like sealing members, 160 and 162, are located in bores 122 and 124 respectively intermediate the stacks, 132 and 134, of fasteners 130 and the inwardly turned ends, 126 and 128, of the sleeve. The use of the rubber bushings or other sealing members is optional and will be elected when it is desirable to provide a low pressure fluid seal for the pipe joint.

The bores 122 and 124 are of an interior diameter A which is somewhat greater than the exterior diameter B of the pipes to be received. With the exception of the inclusion of the rubber grommet or sealing members, 160 and 162, the coupling 110 is functionally identical to the coupling 10 described above.

Figure 5:
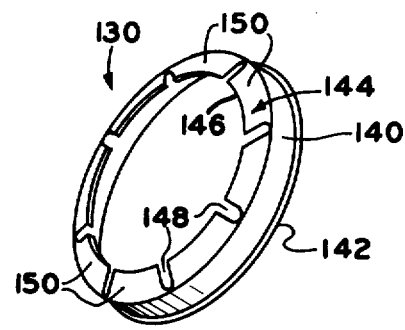
FIG. 5 is a perspective view of one of the pipe end receiving and retaining fasteners utilized in the coupling of FIG. 4.
Figure 6:
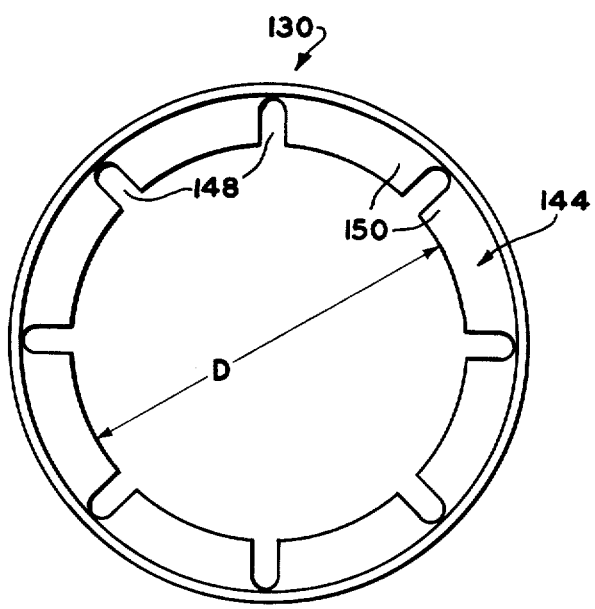
FIG. 6 is a front view of the fastener of FIG. 5.
Figure 7:
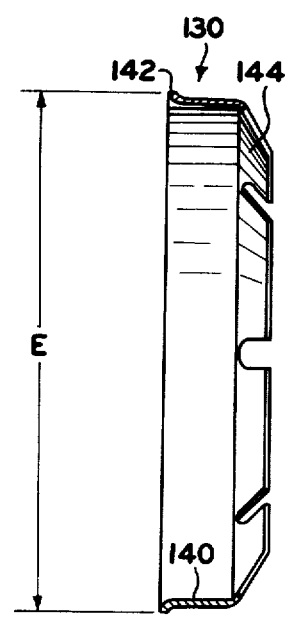
FIG. 7 is a side elevational view of the fastener of FIG. 5.

The pipe end receiving and retaining fasteners 130 utilized in coupling 110 are structurally different from the fasteners 30 utilized in coupling 10. The fastener 130, as illustrated in FIGS. 5–7, comprises an annular flange 140 which includes a radially outwardly flaired edge 142 thereon. Extending radially inwardly from the flange 140 is an inner wall portion 144 which terminates at radially inner edge 146. The inner wall portion 144 is inclined away from the flange 140 and is serrated as at 148 to provide a plurality of spring fingers 150. The serrated edge 146 defines an aperture of diameter D which is smaller than the exterior diameter B of the pipes to be coupled. The outwardly flaired edge 142 is inclined away from the radially inner edge 146 of wall 144. The outwardly flaired edge 142 defines a circle of diameter E which is slightly greater than the interior diameter A of bores 122 and 124.

In assembling a coupling 110, a stack of fasteners, 132 or 134, is inserted into the bores 122 and 124 respectively. The fasteners are arranged such that the inner edges 146 of the spring fingers 150 which constitute inner wall portion 144 are inclined away from the end of the bore from which the pipe is to be inserted. The outwardly flaired edge 142 of flange 140 is inclined towards the end of the bore from which the pipe is to be inserted. The outer edge will cammingly and resiliently deflect inwardly as the fasteners 130 are inserted into the bores 122 and 124. The resiliently compressed edges will tightly engage and/or penetrate the walls of the bores in the event the fasteners are urged towards the open ends of the bores. The provision of the outwardly flaired edge 142 results in the fasteners 130 being, to a certain extent, self-retaining within the sleeve 120 and allows the use of a sleeve not having inwardly flaired ends. It is also noted that the stack of fasteners 130 will tend to nest upon an urging of the fasteners towards the open ends of the bores. This nesting will tend to further drive the edges 142 radially outwardly into the walls of the bores for improved self-retention of the fasteners 130.

The pipe receiving and retaining function of fasteners 130 is identical to that of fasteners 30 described above and, thus, will not be described again.

Figure 8:
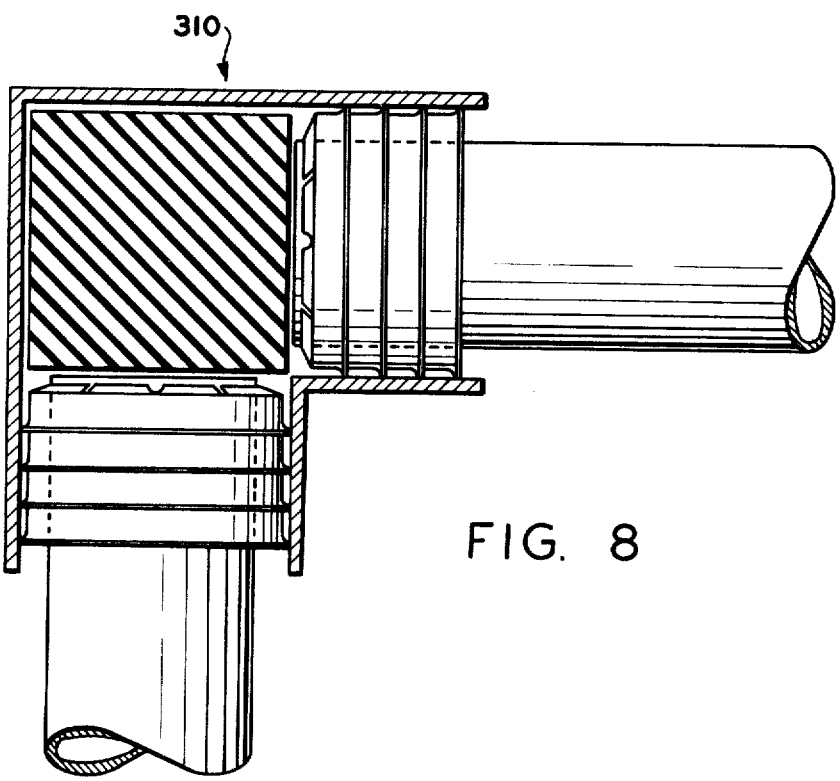
FIG. 8 is a sectional view of an alternate embodiment of the present invention.
Figure 9:
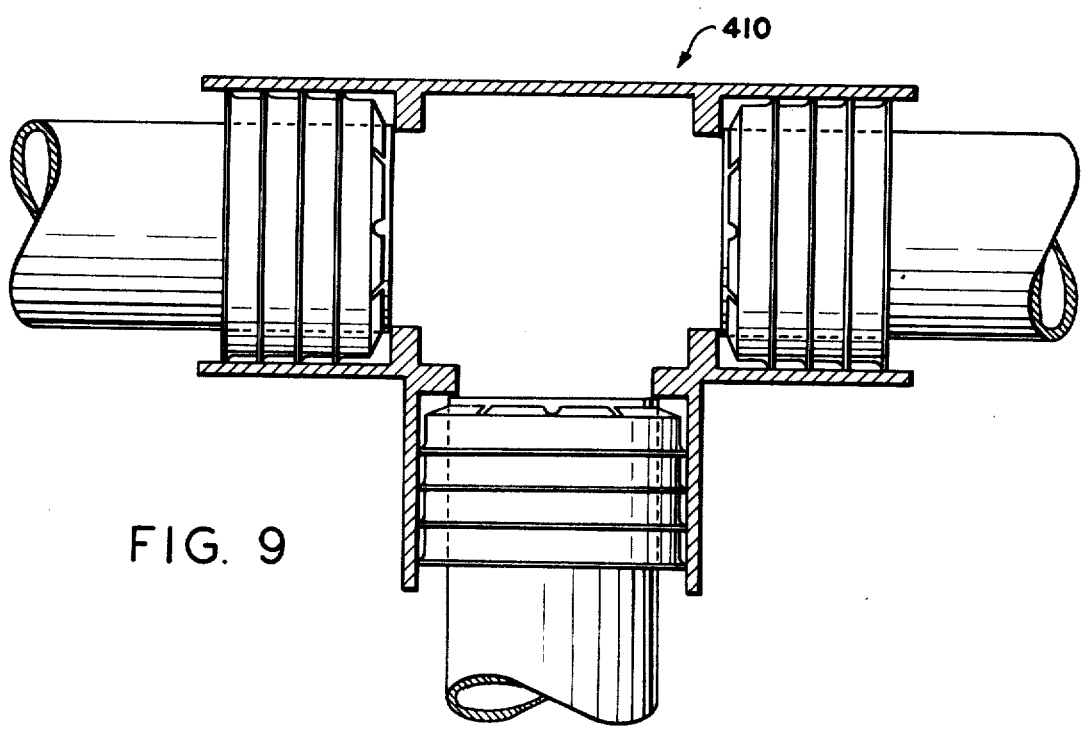
FIG. 9 is a sectional view of an alternate embodiment of the present invention.

Two alternate embodiments of the present invention, couplings, 310 and 410, are illustrated in FIGS. 8 and 9 respectively. Couplings 310 and 410 are simply a right angle elbow and a "T" coupling respectively utilizing the spring steel fasteners 130 of the present invention.

Although this invention has been described in its preferred form with a certain degree of particularly, it is understood that the present description of the preferred embodiments is made by way of example only and various changes in the details of construction and arrangement of the parts may be resorted to without departing from the spirit and the scope of the invention as hereinafter claimed.

I claim:

1. A pipe coupling for connecting the end of a section of pipe to a member such as another section of pipe or the like, said coupling comprising:
   a housing member having a bore therein, said bore having a diameter of larger dimension than the exterior diameter of the section of pipe to be coupled; and
   a plurality of substantially identical, one-piece, stamped spring steel, pipe end receiving and retaining fasteners received and retained in said bore, each of said fasteners having a radially outer flange for contact with the wall of said bore, said fasteners having a radially inwardly extending portion which terminates at an annular edge, said annular edge defining an aperture of somewhat smaller diameter than the exterior diameter of said pipe to be coupled, said radially inwardly extending portion being radially serrated to define a plurality of spring fingers, said spring fingers being inclined with respect to a plane normal to said bore and passing thru the juncture of said flange and said portion, said fasteners being arranged within said bore such that said spring fingers are inclined away from the end of the bore from which the section of pipe is to be inserted, and said flanges extending substantially normally to said plane passing thru the juncture of said flange and said portion in the direction opposite the direction that said spring fingers extend from said plane, the edge of flange most distant said plane being radially outwardly flaired to define a cross-section of greater dimension than the cross-section of said bore.

2. The coupling of claim 1 wherein said housing includes a means located at the end of the bore opposite the end from which the pipe is inserted to prevent passage of said pipe and said fasteners.

3. The coupling of claim 1 wherein said fingers are inclined by an angle of degree $\theta$ with respect to said plane, said degree $\theta$ being in the range of 15° – 65°.

4. The coupling of claim 3 wherein said degree $\theta$ is in the range of 30° – 45°.

5. The coupling of claim 1 wherein the end of the housing defining the end of the bore from which the pipe is to be inserted in flaired inwardly.

6. The coupling of claim 5 wherein a sealing member is interposed said fasteners and said end of said housing.

7. A pipe coupling for connecting the ends of two sections of substantially cross-sectionally round pipe in axially aligned relationship, said coupling comprising:
   a tubular sleeve member having an axially extending bore therethrough, said bore having a diameter of larger dimension than the exterior diameter of the pipe sections to be coupled, said sleeve member including a stop member extending radially inwardly into said bore to prevent passage of a pipe end past said stop member, said stop member dividing said bore into two halves, each half having an open end for receiving and end of a pipe section and an axially inner end adjacent said stop; and
   a plurality of substantially identical, one-piece, spring steel, pipe end receiving and retaining fasteners received and retained in each bore half, each of said fasteners having an annular radially outer flange for contact with the wall of said bore halves, said fasteners having a radially inwardly extending portion which terminates at an annular edge, said annular edge defining an aperture of somewhat smaller diameter than the exterior diameter of said pipe sections, said radially inwardly extending portion being radially serrated to define a plurality of spring fingers, said spring fingers being inclined by an angle in the range of 15° – 65° with respect to a plane normal to said have and passing thru the juncture of said flange and said portion, said flange extending substantially normal with respect to said plane, said fasteners being arranged within each bore half such that said spring fingers are inclined towards said inner end of said bore half, and said flange extending from said plane in the opposite direction that said spring fingers extend from said plane, the annular edge of said flange most distant said plane being radially outwardly flaired and defining a circle having a larger diameter than the interior diameter of the bore.

8. The coupling of claim 7 wherein the ends of the sleeve member adjacent the open ends of the bore halves and inwardly flaired.

9. The coupling of claim 8 wherein a rubber washer having an aperture therethrough of slightly smaller diameter than the exterior diameter of said pipe sections is inserted into said bore halves interposed said fasteners and said ends of said sleeve member.

* * * * *

UNITED STATES PATENT AND TRADEMARK OFFICE
CERTIFICATE OF CORRECTION

PATENT NO. : 3,995,897
DATED : December 7, 1976
INVENTOR(S) : Joseph H. Paskert

It is certified that error appears in the above—identified patent and that said Letters Patent are hereby corrected as shown below:

Col. 1, line 25: Patent 2,832,711 should properly read "2,831,711".

Col. 5, line 21: "particularly" should read "particularity".

Col. 6, line 27: "receiving and" should properly read "receiving an"

line 41: "have" should properly read "bore".

Signed and Sealed this

Fifteenth Day of February 1977

[SEAL]

Attest:

RUTH C. MASON
*Attesting Officer*

C. MARSHALL DANN
*Commissioner of Patents and Trademarks*